No. 741,513.
PATENTED OCT. 13, 1903.
C. H. LINN.
SIPHON.
APPLICATION FILED NOV. 10, 1902.
NO MODEL.
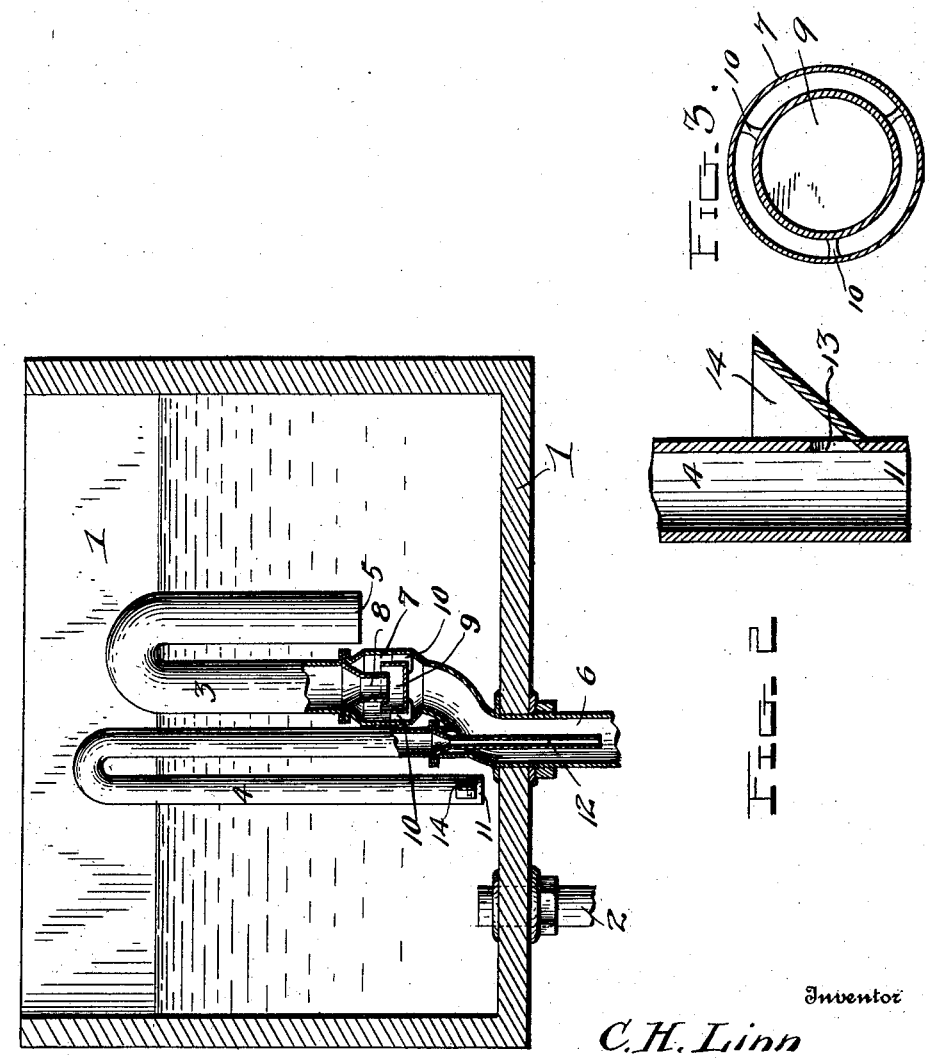
Inventor
C. H. Linn No. 741,513. Patented October 13, 1903.

UNITED STATES PATENT OFFICE.

CLYDE H. LINN, OF NEW BRIGHTON, PENNSYLVANIA, ASSIGNOR OF ONE-HALF TO CHRIS. W. MALI, OF NEW BRIGHTON, PENNSYLVANIA.

SIPHON.

SPECIFICATION forming part of Letters Patent No. 741,513, dated October 13, 1903.

Application filed November 10, 1902. Serial No. 130,703. (No model.)

*To all whom it may concern:*

Be it known that I, CLYDE H. LINN, a citizen of the United States, residing at New Brighton, in the county of Beaver and State of Pennsylvania, have invented certain new and useful Improvements in Siphons; and I do declare the following to be a full, clear, and exact description of the invention, such as will enable others skilled in the art to which it appertains to make and use the same.

This invention relates to siphons for flushing-tanks, and has for its object to provide a single or double flushing-siphon which is simple of construction, comparatively inexpensive of production and efficient in use and which dispenses with the employment of bells, cones, funnels, balls, and other like elements which render the construction costly and at the same time are liable to become choked by foreign bodies in the water.

A further object is to provide a double siphon in which the smaller siphon-pipe embodies a shielded vent which admits air when the water falls to a certain point to stop the flow and which obviates the use of small pipes, dams, &c., heretofore provided for the purpose.

With these and other objects in view the invention consists in certain novel features of construction, combination, and arrangement of parts, as will be more fully described, and particularly pointed out in the appended claims.

In the accompanying drawings, Figure 1 is a vertical section of a water-tank and a part sectional, part side elevational, view of a double siphon embodying the present invention. Fig. 2 is a detail view showing the shielded vent. Fig. 3 is a horizontal section through the sealing chamber and cup.

Referring now more particularly to the drawings, the numeral 1 represents a water-tank which is supplied with water from a pipe 2, from which water continually flows into said tank.

The form of siphon shown in Figs. 1 and 2 comprises a major siphon-pipe 3 and a minor siphon-pipe 4, the said major siphon-pipe being provided with an inlet end 5 and being connected at its opposite end to an outlet-pipe 6. The pipe 6 is provided at its upper end with a trap or sealing-chamber 7, which is bolted or otherwise suitably secured to the discharge end of the siphon 3 and is provided with a downwardly-projecting contracted nozzle 8. This nozzle 8 enters the upper portion of a sealing-pan 9, which is supported from the trap 7 by radial arms 10, spaced apart to form spaces or passages for the downward flow of water, the pan 9 and arms 10 being cast integral with the trap. The smaller siphon-pipe 4 is provided with an inlet end 11, which extends some distance below the inlet end 5 of the pipe 3, and the outlet end of said pipe 4 is connected with the outlet-pipe 6 and provided with a contracted terminal 12, which enters said pipe 6. At a point above this inlet end 11 the inlet branch or arm of the pipe 4 is provided with an air-inlet and vent-opening 13, protected by a shield 14, which shield surrounds the opening and projects above the same and forms an entrance thereto above the line of the top of the opening, whereby water is prevented from flowing into said pipe and preventing air from entering therein, as hereinafter described.

In the operation of the apparatus constructed as shown in Figs. 1 and 2 the water flowing into the tank continues to rise until it reaches the level shown therein and until on flowing upward through the inlet branch of the pipe 3 it passes into the discharge branch thereof and thence flows downward through said branch and when sufficient to overcome the head in the trap 7 overflows the pan 9 and breaks the seal, whereupon the water is caused to flow continuously from the tank through the pipe 3 and downward through the spaces between arms 10 into the outlet-pipe 6 until the water in the tank falls below the level of the inlet 5. At the same time the water flowing through the large siphon 3 creates a vacuum which induces the flow of water through the small siphon 4, and the outlet of water from the tank through this siphon 4 continues until the water in the tank falls below the inlet 13, whereupon air enters the pipe 4 through the inlet 13 and stops the further flow of the water. The same operation ensues when the water falls below the inlet 5 of the siphon 3, as air then enters said siphon and reëstablishes the seal in the chamber 7.

The function of the cup or pan 9 is to seal (by the water which it contains) sufficient air in the siphon-pipe 3 to allow the tank to fill. This seal is broken when the head of the column of water in pipe 3 is sufficient to overcome the pressure in the trap 7 by the water entering and overflowing the cup 9, as will be readily understood. The water descending the outlet-leg of siphon 3 is conducted into the cup 9 by the nozzle 7, which therefore forms part of the trap. The extremity of the nozzle 7 extends only about three-sixteenths of an inch into the cup to secure delicacy and quickness of action in the formation and breaking of the seal and to prevent dribbling. Hence as soon as the water begins to flow from the leg 5 into the leg 3 the seal is broken and the siphonic action started and the water continues to discharge through the major siphon-pipe until the water falls below the inlet end of leg 5, when the access of air to the major siphon-pipe restores the seal, as will be readily understood.

I have found by exhaustive experimentation that by locating the pan 9 in the sealing-chamber 7 at the junction of the pipe 3 with the pipe 6 a highly-efficient construction of siphon is produced without the necessity of employing bells, cones, funnels, balls, and other like elements which render the construction costly and at the same time are liable to become chocked by foreign bodies in the water. By the described construction also I am enabled to produce a siphon at a minimum cost, as the parts of the trap are not exposed and require no machine-finishing, and the device is made simpler and much more easy to clean, as by simply detaching the pipe 3 from the pipe 6 access to the interior of the trap 7 may be conveniently affected for the removal of foreign deposits.

The function of the smaller siphon 3 is to give a slow secondary flush to refill the closet-bowl. The large and rapid volume of water furnished by the siphon-pipe 3 cleanses the bowl and is then followed by the slower and smaller volume of water furnished by the siphon-pipe 4, which refills the bowl. Without this siphon-pipe 4 the siphon could only be used as a wash-out, as the flush from pipe 3 is too large and rapid to be trapped in the bowl.

The purposes of the inlet 13, as stated, are to let in air to break the vacuum in the pipe 4 and prevent the further flow of water when the level of the water in the tank falls below said inlet. It has been found in practice that when this inlet is left exposed the water may in some conditions rise so rapidly in the tank as to keep the inlet and lower end of the inlet branch 4 filled with water, thus preventing the inlet of air, and consequently the breaking of the vacuum, so that water will continue to flow through said pipe into the outlet-pipe 6, which is objectionable for obvious reasons. By the provision of the shield 14 this objection is overcome, as the shield prevents the water from entering the inlet 13 until the level of the water is slightly higher than the shield, so that immediately upon the falling of the water below the inlet-opening 13 air will enter said opening and stop the outflow of water, while the shield will prevent the water from gushing up or rising too rapidly to cut off the inlet of air through said opening.

From the foregoing description, taken in connection with the accompanying drawings, it is thought that the construction, operation, and advantages of my improved siphon will be readily apparent without requiring a more extended explanation.

Various changes in the form, proportion, and minor details of construction may be resorted to without departing from the principle or sacrificing any of the advantages of this invention.

Having thus fully described my invention, what I claim, and desire to secure by Letters Patent, is—

1. In a siphon, the combination of an outlet-pipe provided with a trap or seal, a primary siphon-pipe connected to said outlet-pipe, a minor siphon-pipe having one end discharging into the outlet-pipe, and provided at its inlet end with a side opening for inlet of air, and a shield on the side of the pipe immediately about said opening, said shield inclosing the opening at bottom and sides, and open at top above the opening, substantially as described.

2. In a siphon, the combination of a major siphon-pipe, an outlet-pipe supporting the same, said outlet-pipe being provided below the discharge end of the major siphon-pipe with a trap or sealing chamber provided with a vertically-extending contracted nozzle, a foraminous partition and an open-topped pan supported by said partition and receiving the lower end of the nozzle, together with a minor siphon-pipe having one end discharging into the outlet-pipe below said trap and its opposite end open for the inlet of water and provided with an air-opening and a shield guarding said opening, substantially as described.

3. In a siphon, the combination of an outlet-pipe provided with a trap or seal, a primary siphon-pipe connected to said outlet-pipe, a minor siphon-pipe having one end discharging into the outlet-pipe and provided at its inlet end with a side opening and a shield formed integrally on the side of the pipe and closed on three sides, the top of the shield being open above the outlet, substantially as described.

4. The combination of a U-shaped major siphon-pipe, a discharge-pipe connected to the discharge-leg thereof, an automaticallybroken seal in said pipe, and a U-shaped minor siphon-pipe having its inlet-leg submerged deeper than the inlet-leg of the major siphon-pipe, and having its discharge-leg extending into said discharge-pipe below the seal, substantially as described.

In testimony whereof I have hereunto set my hand in presence of two subscribing witnesses.

CLYDE H. LINN.

Witnesses:
 JOSEPH SWESEY,
 CHAS. W. BRADSHAW.